US007653161B2

(12) United States Patent
Peeters et al.

(10) Patent No.: US 7,653,161 B2
(45) Date of Patent: *Jan. 26, 2010

(54) METHOD OF AND SYSTEM FOR OPTIMIZING THE CAPACITY OF A DIGITAL COMMUNICATION SYSTEM IN PRESENCE OF BOTH INTERNAL AND EXTERNAL NOISE

(75) Inventors: Miguel Peeters, Woluwe-Saint-Lambert (BE); Raphael Cassiers, Braine-l'Alleud (BE)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/071,676

(22) Filed: Feb. 25, 2008

(65) Prior Publication Data

US 2008/0144750 A1    Jun. 19, 2008

Related U.S. Application Data

(63) Continuation of application No. 10/698,861, filed on Nov. 3, 2003, now Pat. No. 7,362,828.

(60) Provisional application No. 60/422,852, filed on Nov. 1, 2002.

(51) Int. Cl.
*H04B 1/10* (2006.01)
(52) U.S. Cl. .................. 375/346; 375/259; 375/219; 375/227; 375/285; 455/296
(58) Field of Classification Search ................ 375/346, 375/219, 227, 261, 259; 455/296, 501; 327/551, 327/310, 384
See application file for complete search history.

(56) References Cited

U.S. PATENT DOCUMENTS

| 5,832,387 | A | * | 11/1998 | Bae et al. .................. 455/522 |
| 2002/0118733 | A1 | * | 8/2002 | Frenkel ...................... 375/219 |
| 2003/0086486 | A1 | * | 5/2003 | Graziano et al. ............ 375/222 |
| 2003/0099208 | A1 | * | 5/2003 | Graziano et al. ............ 370/286 |
| 2003/0099285 | A1 | * | 5/2003 | Graziano et al. ............ 375/220 |
| 2003/0101206 | A1 | * | 5/2003 | Graziano et al. ............ 708/277 |

OTHER PUBLICATIONS

Raymond Steele, SNR Formula for Linear Delta Modulation with Band-Limited Flat and RC-Shaped Gaussian Signals Communications, IEEE Transaction, vol. COM. 28, No. 12, Dec. 1980, pp. 1977-1984.

* cited by examiner

*Primary Examiner*—Shuwang Liu
*Assistant Examiner*—Helene Tayong
(74) *Attorney, Agent, or Firm*—Sterne, Kessler, Goldstein & Fox, PLLC.

(57) ABSTRACT

A method of optimizing a communication system for receiving and processing an input communication signal includes selecting a first noise margin m to be applied against an external noise present on the input communication signal. The method further includes selecting a second noise margin $m_i$ to be applied against an internal noise introduced on the communications signal by the communication system. The second noise margin is a predetermined function of the first noise margin. The method also includes calculating a virtual noise to signal ratio that is a combination of an external noise to signal ratio $NSR_e$, an internal noise to signal ratio $NSR_i$, the first noise margin and the second noise margin. The method further includes adjusting one or more system parameters so as to maintain the virtual noise to signal ratio at a predetermined margin above a required noise to signal ratio.

31 Claims, 1 Drawing Sheet

METHOD OF AND SYSTEM FOR OPTIMIZING THE CAPACITY OF A DIGITAL COMMUNICATION SYSTEM IN PRESENCE OF BOTH INTERNAL AND EXTERNAL NOISE

CROSS-REFERENCE TO RELATED APPLICATIONS

This application claims priority to and is a continuation of U.S. patent application Ser. No. 10/698,861, filed Nov. 3, 2003, which claims the benefit of U.S. Provisional Application No. 60/698,861, filed Nov. 3, 2003, all of which are incorporated herein by reference in their entireties.

STATEMENT REGARDING FEDERALLY SPONSORED RESEARCH

Not Applicable

REFERENCE TO MICROFICHE APPENDIX

Not Applicable

BACKGROUND OF THE INVENTION

The present invention relates to noise in digital communication systems, and more particularly, to distinguishing particular classifications of noise in a digital communication system and using those distinctions to determine an accurate noise margin.

The reliability of a digital communication channel is commonly expressed in term of Bit Error Rate (referred to herein as "BER"). A digital communication system is typically designed to provide a reliability level better than some worst-case reference level, further referred as $BER_{req}$, dependant on the type of service provided above this communication channel.

Digital signal processing theory shows that the bit error rate of a communication system is a function of the Signal power to Noise power Ratio (referred to herein as "SNR") at the input of the receiver. Let us call $SNR_{req}$ the required SNR necessary to achieve a BER equal to $BER_{req}$. In order to provide a good quality of service, it is common practice to require that a communication system operate at an SNR exceeding $SNR_{req}$ by some factor known in the art as Noise Margin (referred to herein as "m"). The Noise Margin is defined as the amount of external noise increase that the communication system can tolerate while still insuring a data transport with a BER lower than $BER_{req}$. The Noise Margin m may be calculated as:

$$m = \frac{SNR}{SNR_{req}}$$

The noise margin is typically expressed in a logarithmic scale (e.g., in dB).

The noise present in a communication system can be classified according to its source. For example, the noise can theoretically distinguished as:

The external noise ($N_e$) defined as the noise already present on the signal at the input of the receiver The internal noise ($N_i$) defined as the equivalent noise increase introduced by the non-ideal behavior of the receiver. This typically includes the receiver input noise, analog to digital converter noise and non-linear behavior, residual echo noise in duplex systems, residual inter-symbol interference, etc. . . .

The noise margin required from a communication system only applies to the noise sources that are subject to variation over time. In many systems, the internal noise can be safely considered as being constant over the time, and therefore does not figure into the noise margin calculation. However, for the sake of simplicity, in many communication systems no distinction is made between internal and external noise in the computation of the noise margin. One disadvantage to computing noise margin this way is that the resulting noise margin may be unnecessarily large, which translates to sub-optimal system performance in areas such as data throughput, range or power consumption.

It is an object of the present invention to substantially overcome the above-identified disadvantages and drawbacks of the prior art.

SUMMARY OF THE INVENTION

The present invention describes a method to easily introduce the distinction of internal and external noise in the computation of the noise margin of a communication system, thereby improving the performance of this communication system. This improvement may either take the form of improved rate, reach or consumed power.

The foregoing and other objects are achieved by the invention which in one aspect comprises a method of optimizing a communication system for receiving and processing an input communication signal. The method includes selecting a first noise margin m to be applied against an external noise present on the input communication signal. The method further includes selecting a second noise margin $m_i$ to be applied against an internal noise introduced on the communications signal by the communication system. The second noise margin is a predetermined function of the first noise margin. The method also includes calculating a virtual noise to signal ratio that is a combination of an external noise to signal ratio $NSR_e$, an internal noise to signal ratio $NSR_i$, the first noise margin and the second noise margin. The method further includes adjusting one or more system parameters so as to maintain the virtual noise to signal ratio at a predetermined margin above a required noise to signal ratio.

Another embodiment further includes distinguishing the external noise and the internal noise, and determining a contribution to a total noise from each of the external noise and the internal noise.

Another embodiment further includes distinguishing and determining the external noise and internal noise by first determining one or more system parameters associated with the communication system, then performing a first noise power measurement with no output signal being generated from an associated communication system transmitter, and while the communication system is receiving and decoding a known periodic signal. Next, performing a second noise power measurement while the associated communication system transmitter is generating output signals, and while the communication system is receiving and decoding a known periodic signal, then performing a third noise power measurement while the associated communication system transmitter is generating output signals, and while the communication system is receiving and decoding a pseudo-random signal. Then, the embodiment includes determining the external noise by subtracting a known receiver noise floor from the first power measurement, and determining the internal noise floor by subtracting the external noise from the third power measurement.

Another embodiment further includes calculating the virtual noise to signal ratio as a sum of $NSR_e$, and a product of (i) a ratio of the second noise margin to the first noise margin and (ii) $NSR_i$, such that the virtual noise to signal ratio is substantially equal to $$NSR_e + \frac{m_i(m)}{m} NSR_i.$$

Another embodiment further includes adjusting the one or more system parameters, wherein the predetermined margin is substantially equal to the first noise margin m.

Another embodiment further includes selecting the first noise margin and the second noise margin such that the first noise margin is greater than or equal to the second noise margin for all time.

Another embodiment further includes selecting a target margin corresponding to the first noise margin at an initial time, and selecting a target internal margin corresponding to the second noise margin at an initial time. The target internal margin is a predetermined function of the target margin.

Another embodiment further includes selecting the first noise margin and the second noise margin such that the first noise margin remains stable in the presence of one or more measurement errors.

Another embodiment further includes, in a multiple carrier communication system, selecting a first noise margin and a second noise margin for each carrier channel, and adaptively equalizing the noise margins across all of the multiple carriers via real-time adjustment of the one or more system parameters.

Another embodiment further includes, in a multiple carrier communication system, selecting an internal noise margin that is a function of the mean external margin, i.e., the mean system margin.

Another embodiment further includes calculating the second noise margin $m_i$ as a predetermined function of the first noise margin m, wherein the second noise margin $m_i$ is given by (in dB):

$$\begin{cases} m_{dB} & m_{dB} \leq 1.5 \\ \frac{2-1.5}{m_{target,dB} - 1.5}(m_{dB} - 1.5) + 1.5 & \text{for } 1.5 < m_{dB} \leq m_{target,dB} \\ m_{dB} - m_{target,dB} + 2 & m > m_{target,dB} \end{cases}$$

whereby $m_i$ takes on different functions of m according to different ranges of m.

In another aspect, the invention includes an apparatus for optimizing a communication system for receiving and processing an input communication signal. The apparatus includes a parameter monitoring component for monitoring one or more system parameters associated with the communication system. The apparatus further includes a noise monitoring component for measuring noise power in the communication system. The apparatus also includes a virtual noise processor for calculating a virtual noise to signal ratio that is a combination of an external noise to signal ratio $NSR_e$, an internal noise to signal ratio $NSR_i$, a first noise margin and a second noise margin. The apparatus also includes a system parameter processor for adjusting one or more system parameters so as to maintain the virtual noise to signal ratio at a predetermined margin above a required noise to signal ratio.

In another embodiment, the noise monitoring component distinguishes the external noise and the internal noise, and determines a contribution to a total noise from each of the external noise and the internal noise.

In another embodiment, the noise monitoring component distinguishes and determines the external noise and internal noise by determining one or more system parameters associated with the communication system, and by performing a first noise power measurement with no output signal being generated from an associated communication system transmitter, and while the communication system is receiving and decoding a known periodic signal. The noise monitoring component further distinguishes and determines the external noise and internal noise by performing a second noise power measurement while the associated communication system transmitter is generating output signals, and while the communication system is receiving and decoding a known periodic signal. The noise monitoring component further distinguishes and determines the external noise and internal noise by performing a third noise power measurement while the associated communication system transmitter is generating output signals, and while the communication system is receiving and decoding a pseudo-random signal, and by determining the external noise by subtracting a known receiver noise floor from the first power measurement. The noise monitoring component further distinguishes and determines the external noise and internal noise by determining the internal noise floor by subtracting the external noise from the third power measurement.

In another embodiment, the virtual noise processor calculates the virtual noise to signal ratio as a sum of $NSR_e$, and a product of (i) a ratio of the second noise margin to the first noise margin and (ii) $NSR_i$, such that the virtual noise to signal ratio is substantially equal to $$NSR_e + \frac{m_i(m)}{m} NSR_i.$$

In another embodiment, the system parameter processor adjusts the one or more system parameters, and the predetermined margin is substantially equal to the first noise margin m.

In another embodiment, the virtual noise processor selects the first noise margin and the second noise margin such that the first noise margin is greater than or equal to the second noise margin for all time.

In another embodiment, the virtual noise processor selects a target margin corresponding to the first noise margin at an initial time, and selects a target internal margin corresponding to the second noise margin at an initial time, wherein the target internal margin is a predetermined function of the target margin.

In another embodiment, the noise processor selects the first noise margin and the second noise margin such that the first noise margin remains stable in the presence of one or more measurement errors.

In another embodiment, the virtual noise processor selects, in a multiple carrier communication system, a first noise margin and a second noise margin for each carrier channel, and adaptively equalizes the noise margins across all of the multiple carriers via real-time adjustment of the one or more system parameters.

In another embodiment, the virtual noise processor calculates the second noise margin $m_i$ as a predetermined function of the first noise margin m, wherein the second noise margin $m_i$ is given by (in dB):

$$\begin{cases} m_{dB} & m_{dB} \leq 1.5 \\ \dfrac{2-1.5}{m_{target,dB}-1.5}(m_{dB}-1.5)+1.5 & \text{for } 1.5 < m_{dB} \leq m_{target,dB} \\ m_{dB}-m_{target,dB}+2 & m > m_{target,dB} \end{cases}$$

whereby $m_i$ takes on different functions of m according to different ranges of m.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 1:
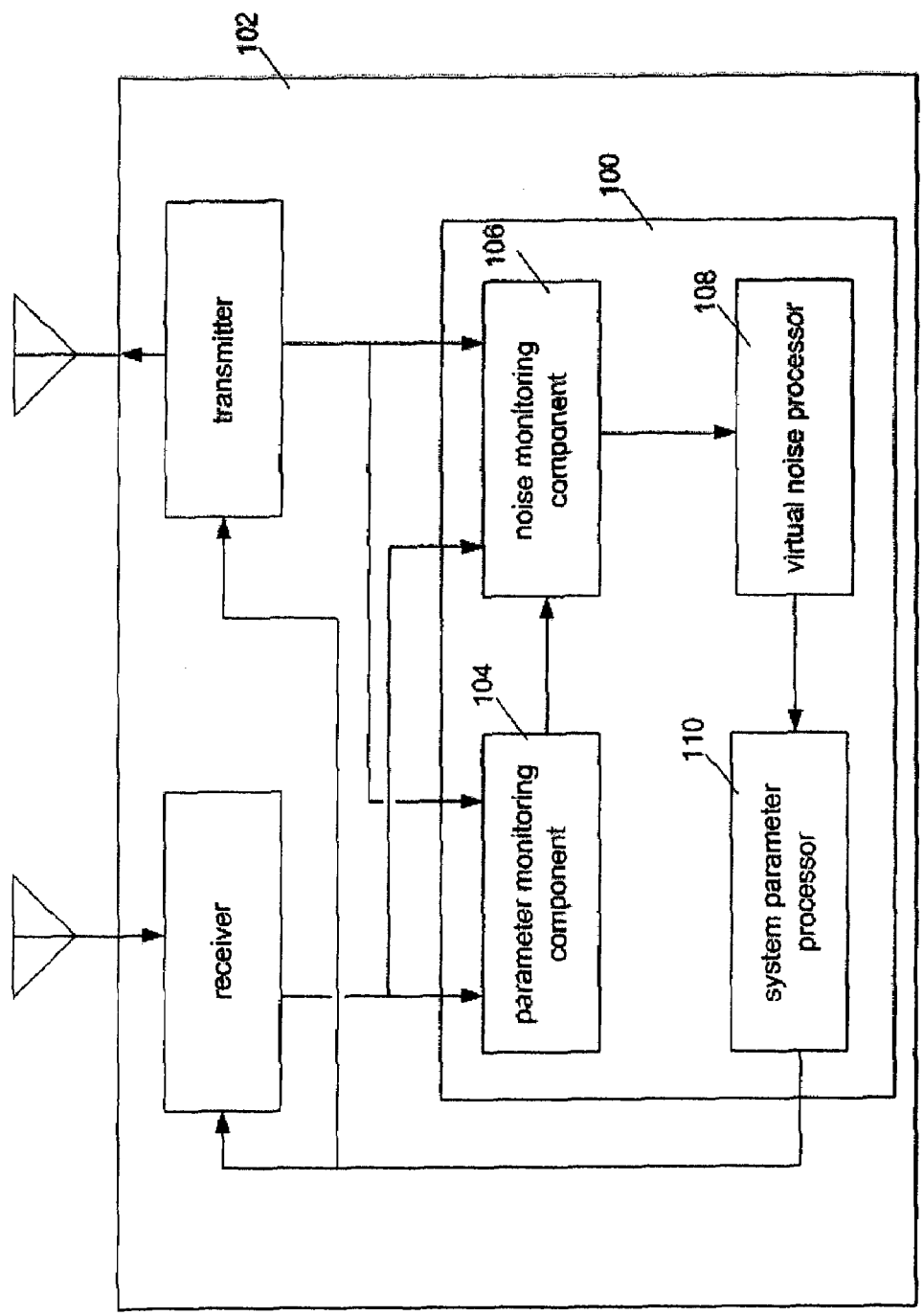
FIG. 1 shows a block diagram of one embodiment of an apparatus for optimizing a communication system for receiving and processing an input communication signal.

One embodiment of the method and system described herein relies on the assumption that the associated receiver is capable of making the distinction between the external noise affecting the received signal, and the internal noise that its own non-ideal implementation introduces on the signal. In other embodiments for which a precise distinction cannot be made, a coarse estimation of the internal noise may be used.

As an example, the following strategy could be followed to distinguish, in a transceiver, the respective contribution of internal and external noise sources in the measured noise power:

1. Determine all of the relevant transceiver parameter settings (e.g., transmitter gain, receiver gain, equalizer coefficients, echo canceller coefficients, etc.).
2. Perform a first measurement of the noise power, $N_1$, while the transmitter is silent and the receiver decodes a known periodic signal. Only external noise and the known receiver noise floor are measured:

$$N_1 \cong N_e + N_{RxNoiseFloor} \quad (1)$$

3. Perform a second measurement of the noise power, $N_2$, whilst the transmitter is generating signals, and the receiver decodes a known periodic signal. In addition to the previous measurement, the echo of all transmitter noises (both residual echo-canceller noise and non-linear distortion noise) are present:

$$N_2 \cong N_1 + N_{TxEchoNoise} \quad (2)$$

4. Perform a third measurement of the noise power, $N_3$, whilst the transmitter is generating signals, and the receiver decodes a known pseudo-random signal. In addition to the previous measurement, the inter-symbol interference equivalent noise is measured:

$$N_3 \cong N_2 + N_{ISInoise} \quad (3)$$

From the above measurements, we can derive an approximation of the internal and external noise sources:

$$N_e \cong N_1 - N_{RxNoiseFloor} \quad (4)$$

$$N_i \cong N_{RxNoiseFloor} + N_{TxEchoNoise} + N_{ISInoise} \quad (5)$$

$$N = N_e + N_i \quad (6)$$

It is often easier to handle Signal to Noise Ratio (SNR) values, or equivalently Noise to Signal power Ratio (NSR) values, than absolute noise or signal power, we can re-write (6) relative to the received signal power:

$$NSR = NSR_e + NSR_i \quad (7)$$

The method and system described herein proposes an easy way to cope with the requirement that a different noise margin should be taken on the internal and on the external noise sources. Even if the internal noise is assumed to be constant, it may be necessary to take some margin against this noise as well, such as to insure a nominal operation at a BER level lower than $BER_{req}$ or/and to insure that small variation on the internal noise do not cause the noise the system to exceed $BER_{req}$.

If we call m and $m_i$ respectively the required noise margins on external and internal noise, a virtual noise $N_V$ may be defined such that:

$$mN_V = mN_e + m_i(m)N_i \quad (8)$$

Alternatively:

$$NSR_V = NSR_e + \frac{m_i(m)}{m} NSR_i \quad (9)$$

The basic idea behind the method and system described herein is to replace in the design of a communication system the use of real SNR values by a virtual SNR value, $SNR_V$, as given by equation (9). $SNR_V$ incorporates one margin, m, against the external noise, and a different margin, $m_i$, against the internal noise. By choosing a margin on internal noise lower than the margin on external noise, this virtual SNR is larger than the real SNR. Nevertheless, a design based on the virtual SNR still insures that the required noise margin is achieved against the external noise sources.

When the external noise varies, the margin computed from this virtual SNR varies accordingly:

$$m_{dB} = 10 \log_{10}\left(\frac{NSR_{req}}{NSR_V}\right) \quad (10)$$

It is desirable to also let the internal margin $m_i$ be a function of the instantaneous margin m, such that:
- the margin $m_i$ taken against internal noise is always lower than the margin taken against external noises, i.e., $m_i(m) \leq m$
- at initialization time, a target margin $m_0$ taken against external noises corresponds to the wanted target internal margin: $m_i(m_0) = m_{i0}$
- the computed margin is stable, even in the presence of some measurement errors To analyze under which conditions this scheme will lead to a stable system behavior, consider the following limit cases.

First, consider a system with no internal noise. In this trivial case, equation (8) reduces to:

$$NSR_V = NSR_e, \tag{8'}$$

i.e., the virtual SNR is equal to the external SNR.

Next, consider a system limited by internal noises, but without error on the estimation of $NSR_i$ (i.e., $NSR=NSR_i$). Assume a linear dependency of the noise margin against internal noise with respect to the noise margin against the virtual noise computed:

$$m_{i,dB} = a \cdot m_{dB} + b \tag{11}$$

Equations (9) and (10) represent an iterative process. In order to determine the conditions for which the process converges and the corresponding convergence values, it is necessary to evaluate equations (9) and (10) with $NSR_e=0$. Doing so gives the iteration equation:

$$m_{k+1,dB} = m_{k,dB} + m_{i,dB}^{real} - m_{i,dB}(m_k) \tag{12}$$

where $$m_{i,dB}^{real} = 10\log_{10}\left(\frac{NSR_{req}}{NSR_i}\right)$$

represents the real margin on the internal noise.

Using the assumed linear dependency given by equation (11), the iteration equation (12) can be rewritten:

$$m_{k+1,dB} = m_{k,dB} + m_{i,dB}^{real} - (a \cdot m_{k,dB} + b) \tag{13}$$

This system as an equilibrium point if $a<>0$ for $$m_{dB} = \frac{m_{i,dB}^{real} - b}{a} \tag{14}$$

To determine under which condition this equilibrium point is stable, evaluate the convergence of the error towards the mean value, which gives:

$$e_{k+1} = (1-a) \cdot e_k \tag{15}$$

The error is thus converging to 0 if $|a|<1$. In particular, if $a=0$ (i.e., if the margin taken against internal noise does not depend on the margin against the virtual noise), then the system does not converge. Further, if $a=1$, the margin converges in one iteration to its equilibrium point.

One proposed formula for $m_i(m)$ is $$m_{i,dB} = \begin{cases} m_{dB} & m_{dB} \leq 1.5 \\ \frac{2-1.5}{m_{target,dB}-1.5}(m_{dB}-1.5)+1.5 & \text{for } 1.5 < m_{dB} \leq m_{target,dB} \\ m_{dB} - m_{target,dB} + 2 & m > m_{target,dB} \end{cases} \tag{16}$$

This formula gives an internal margin $m_{i0}$ of 2 dB for the initial target margin.

One embodiment of the method and system described herein may be used in a multi-carrier transmission system, in which a set of N carrier signals are used to convey the information bits, where N is an integer greater than or equal to two. The SNR, and hence the noise margin, is monitored on each carrier independently. In some embodiments, the noise margin is adaptively equalized across all sub-carriers via techniques known in the art, such as on-line (e.g., real time) adjustment of the gain and bit loading of each sub-carrier. The proposed method to handle different margin requirements against internal and external noises allows such margin equalization algorithm to remain unchanged, and to still optimally equalize the margin according to this new constraint.

The basic equations (8), (9) and (10) derived herein for a single carrier system can easily be extended to the multi-carrier case, as follows:

$$\overline{m}N_V^l = \overline{m}N_e^l + m_i^l(\overline{m})N_i^l \tag{8b}$$

$$NSR_V^l = NSR_e^l + \frac{m_i^l(\overline{m})}{\overline{m}}NSR_i^l \tag{9b}$$

$$\overline{m}_{dB} = \frac{10}{N}\sum_{l=0}^{N-1}\log_{10}\left(\frac{NSR_{req}^l}{NSR_V^l}\right) \tag{10b}$$

The superscript l is used to identify carrier-dependant entities. Equations (8b), (9b) and (10b) demonstrate that for a multi-carrier case, the internal noise margin $m_i^l(\overline{m})$ is solely a function of the mean margin $\overline{m}$.

Considering again the behavior of a system with no external noise, we can derive the iteration equation for the mean margin:

$$\overline{m}_{k+1,dB} = \overline{m}_{k,dB} + \overline{m}_{i,dB}^{real} - m_{i,dB}(\overline{m}_k) \tag{12b}$$

with $$\overline{m}_{i,dB}^{real} = \frac{10}{N}\sum_{l=0}^{N-1}\log_{10}\left(\frac{NSR_{req}^l}{NSR_i^l}\right)$$

the real mean margin on the internal noise.

In one embodiment, the dependence of the internal margin $m_i$ on the mean margin is linear in dB. The iteration equation (12) can then be rewritten as:

$$\overline{m}_{k+1,dB} = \overline{m}_{k,dB} + \overline{m}_{i,dB}^{real} - (a \cdot \overline{m}_{k,dB} + b) \tag{13b}$$

This system has an equilibrium point if $a<>0$ for $$\overline{m}_{dB} = \frac{\overline{m}_{i,dB}^{real} - b}{a} \tag{14b}$$

This formula shows that the relationship between $m_i$ and $m$ holds for the mean margin on the internal noise and the mean margin at the equilibrium point. The stability condition remains the same as the one previously derived.

The reported margin on one tone is given by:

$$m = \frac{\overline{m}}{m_i(\overline{m})}m_i^{real} \tag{20}$$

with $m_i^{real}$ the real margin on this tone to internal NSR. This equations implies that:
- the reported margin depends on the mean margin. So, if the real internal margin is constant, the margin can change due to mean margin change. In fact, if the relationship is linear in dB, we show $$m_{new,dB} = m_{old,dB} + (1-a) \cdot \alpha$$

with $\alpha$ the change in dB on the mean margin. This dependence vanishes if a=1.
- a change in dB on the internal margin with a constant mean margin, for example due to a carrier-dependant gain adjustment, induces the same change in dB on the reported margin.

In general, a method and system is disclosed herein for handling different noise margin constraints on internal and external noise components in a communication system, thereby improving the system performance parameters with a minimal complexity impact. The stability of the proposed scheme has been analyzed under particular limit conditions, and a specific implementation is proposed, which provides up to 4 dB improvement in system performances. The method and system disclosed herein is particularly useful for a multiple carrier system, and this disclosure analyzes how such system behaves when one embodiment of the method and system is incorporated.

FIG. 1 shows a block diagram of one embodiment of an apparatus 100 for optimizing a communication system 102 for receiving and processing an input communication signal. The apparatus 100 includes a parameter monitoring component 104 that monitors the system parameters associated with the communication system 102. The apparatus 100 further includes a noise monitoring component 106 that receives input from the system 102 and the parameter monitoring component 104 and distinguish and determine the contributions of the external noise and the internal noise to the overall noise. A virtual noise processor 108 receives the external and internal noise values from the noise monitoring component 106, and calculates a virtual noise value from the noise components, along with separate external and internal noise margins, as disclosed herein. A system parameter processor 110 receives the virtual noise value from the virtual noise processor 108 and adjusts one or more system parameters so as to maintain the virtual noise to signal ratio at a predetermined margin above the require noise to signal ratio (i.e., to maintain the desired noise margin).

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

We claim:

1. A method of controlling operation of a communications system for receiving and processing an input communication signal to produce an output communication signal, comprising:
   selecting a first noise margin relating to an external noise level present in the input communication signal, wherein the first noise margin is an amount of external noise increase that the communications system can tolerate while still insuring a data transport with a bit error rate less than a required bit error rate;
   selecting a second noise margin relating to an internal noise level generated by the communications system, wherein the second noise margin is a function of the first noise margin, and wherein a value of the second noise margin is less than a value of the first noise margin;
   calculating a virtual noise-to-signal ratio based on an external noise-to-signal ratio NSRe, an internal noise-to-signal ratio NSRi, said first noise margin, and said second noise margin; and
   controlling at least one operating parameter of the communications system to maintain said virtual noise-to-signal ratio at a predetermined margin above a required noise-to-signal ratio.

2. The method of claim 1, wherein said second noise margin is a predetermined function of said first noise margin.

3. The method of claim 1, comprising:
   determining an estimate of said external noise level;
   determining an estimate of said internal noise level; and
   determining a total noise level based on said estimates of said external noise level and said internal noise level.

4. The method of claim 3, wherein said determining an estimate of said external noise level comprises:
   providing a known periodic signal as the input communication signal;
   performing a first noise power measurement with no output communication signal being generated;
   performing a second noise power measurement while the communications system generates the output communication signal corresponding to said known periodic input signal;
   providing a pseudo-random signal as the input communication signal;
   performing a third noise power measurement while the communications system generates the output communication signal corresponding to said pseudo-random input signal; and
   determining an estimate of said external noise level by subtracting a known receiver noise floor from said first noise power measurement; and
   said determining an estimate of said internal noise level comprises subtracting the external noise level from said third noise power measurement.

5. The method of claim 1, wherein said virtual noise-to-signal ratio is calculated as a sum of $NSR_e$, and a product of: (i) a ratio of the second noise margin to the first noise margin and (ii) $NSR_i$.

6. The method of claim 1, wherein said predetermined margin above a required noise-to-signal ratio is equal to said first noise margin.

7. The method of claim 1, wherein said first noise margin is always greater than or equal to said second noise margin.

8. The method of claim 1, further comprising:
   selecting a target margin corresponding to said first noise margin at an initial time; and
   selecting a target internal margin corresponding to said second noise margin at said initial time;
   wherein said target internal margin is a predetermined function of said target margin.

9. The method of claim 1, wherein said first noise margin and said second noise margin are selected such that said first noise margin remains stable in the presence of one or more measurement errors.

10. The method of claim 1, wherein the communications system is a multiple carrier communications system having a plurality of carrier channels.

11. The method of claim 10, further comprising:
   selecting said first and second noise margins for each said carrier channel; and adaptively equalizing said first and second noise margins across all of said carrier channels via real time adjustment of said at least one operating parameter.

12. The method of claim 10, wherein said second noise margin is a function of a mean first noise margin for the plurality of carrier channels.

13. The method of claim 1, wherein said second noise margin varies based on the value of the first noise margin in dB according to:

$$m_{dB} \text{ for } m_{dB} \leq 1.5,$$

$$\frac{2-1.5}{m_{target,dB}-1.5}(m_{dB}-1.5)+1.5 \text{ for } 1.5 < m_{dB} \leq m_{target,dB}, \text{ and}$$

$$m_{dB} - m_{target,dB} + 2 \text{ for } m > m_{target,dB}.$$

14. A control apparatus for a communications system that receives and processes an input communication signal to produce an output communication signal, comprising:
a virtual noise processor configured to calculate a virtual noise-to-signal ratio based on an external noise-to-signal ratio, an internal noise-to-signal ratio, a first noise margin and a second noise margin, wherein the first noise margin is set as an amount of external noise increase that the communications system can tolerate while still insuring a data transport with a bit error rate less than a required bit error rate, wherein the second noise margin is a function of the first noise margin, and wherein the second noise margin is less than or equal to the first noise margin; and
a parameter processor configured to control at least one operating parameter of the communications system in accordance with the virtual noise-to-signal ratio so as to maintain the virtual noise-to-signal ratio at a predetermined margin above a required noise-to-signal ratio.

15. The control apparatus according claim 14, further comprising:
a noise monitor configured to determine an external noise contribution and an internal noise contribution of the communications system.

16. The control apparatus according to claim 15, wherein said noise monitor determines the external noise contribution and the internal noise contribution based on input relating to a receiver and a transmitter of the communications system.

17. The control apparatus according to claim 16, further comprising a parameter monitor configured to detect at least one operating parameter associated with the communications system.

18. The control apparatus according to claim 17, wherein said noise monitor determines the external noise contribution and the internal noise contribution based on input from the parameter monitor and input relating to the receiver and the transmitter of the communications system.

19. The control apparatus according to claim 17, wherein said parameter monitor detects at least one operation parameter of at least one of said receiver and said transmitter.

20. The control apparatus according to claim 15, wherein said noise monitor is configured to determine an estimate of the external noise contribution, determine an estimate of the internal noise contribution, and determine a total noise level based on the estimates of the external and internal noise contributions.

21. The control apparatus according to claim 20, wherein said noise monitor is configured to:
perform a first noise power measurement with no output communication signal being generated;
perform a second noise power measurement while the communications system generates the output communication signal corresponding to a known periodic input signal;
perform a third noise power measurement while the communications system generates the output communication signal corresponding to a pseudo-random input signal; and
determine the estimate of the external noise level by subtracting a known receiver noise floor from the first noise power measurement; and
determine the estimate of the internal noise level by subtracting the external noise level from the third noise power measurement.

22. The control apparatus according to claim 14, wherein said parameter processor controls at least one operating parameter of at least one of a receiver and a transmitter of the communications system.

23. The control apparatus according to claim 14, wherein said virtual noise processor is configured to set the second noise margin as a predetermined function of the first noise margin.

24. The control apparatus according to claim 14, wherein said virtual noise processor calculates the virtual noise-to-signal ratio as a sum of the external noise-to-signal ratio and a product of: (i) a ratio of the second noise margin to the first noise margin and (ii) the internal noise-to-signal ratio.

25. The control apparatus according to claim 14, wherein the predetermined margin above a required noise-to-signal ratio is equal to the first noise margin.

26. The control apparatus according to claim 14, wherein said virtual noise processor is configured to select a target margin corresponding to the first noise margin at an initial time, and select a target internal margin corresponding to the second noise margin at the initial time, wherein the target margin is a predetermined function of the target margin.

27. The control apparatus according to claim 14, wherein said virtual noise processor sets the first noise margin and the second noise margin such that the first noise margin remains stable in the presence of one or more measurement errors.

28. The control apparatus according to claim 14, wherein the communications system is a multiple carrier communications system having a plurality of carrier channels.

29. The control apparatus according to claim 28, wherein said virtual noise processor is configured to select first and second noise margins for each carrier channel, and to adaptively equalize the first and second noise margins across all of the carrier channels via real time adjustment of the at least one operating parameter.

30. The control apparatus according to claim 28, wherein said virtual noise processor is configured to set the second noise margin as a function of a mean first noise margin of the plurality of carrier channels.

31. The control apparatus according to claim 14, wherein said virtual noise processor is configured to variably set the second noise margin in dB according to:

$$m_{dB} \text{ for } m_{dB} \leq 1.5,$$

$$\frac{2-1.5}{m_{target,dB}-1.5}(m_{dB}-1.5)+1.5 \text{ for } 1.5 < m_{dB} \leq m_{target,dB}, \text{ and}$$

$$m_{dB} - m_{target,dB} + 2 \text{ for } m > m_{target,dB}.$$

* * * * *